(12) United States Patent
Riva et al.

(10) Patent No.: US 11,169,991 B2
(45) Date of Patent: *Nov. 9, 2021

(54) SYSTEM AND METHOD FOR EXTRACTING AND SHARING APPLICATION-RELATED USER DATA

(71) Applicant: Microsoft Technology Licensing, LLC, Redmond, WA (US)

(72) Inventors: Oriana Riva, Redmond, WA (US); Suman Kumar Nath, Redmond, WA (US); Douglas Christopher Burger, Bellevue, WA (US); Earlence Tezroyd Fernandes, Ann Arbor, MI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/440,188

(22) Filed: Jun. 13, 2019

(65) Prior Publication Data

US 2019/0294606 A1 Sep. 26, 2019

Related U.S. Application Data

(63) Continuation of application No. 14/734,991, filed on Jun. 9, 2015, now Pat. No. 10,324,926.

(Continued)

(51) Int. Cl.
*G06F 16/24* (2019.01)
*G06F 16/242* (2019.01)
(Continued)

(52) U.S. Cl.
CPC ...... *G06F 16/2448* (2019.01); *G06F 9/44505* (2013.01); *G06F 11/3072* (2013.01);
(Continued)

(58) Field of Classification Search
CPC ............... G06F 16/2448; G06F 16/285; G06F 16/2428; G06F 16/24575; G06F 9/44505; G06F 11/3072; G06F 11/3438
(Continued)

(56) References Cited

U.S. PATENT DOCUMENTS 8,832,847 B2 * 9/2014 Anand ................... H04W 4/60
726/26
8,914,496 B1 * 12/2014 Richardson ............ H04L 43/08
709/224

(Continued)

FOREIGN PATENT DOCUMENTS

| CN | 104615619 A | 5/2015 |
| KR | 102006396 B1 | 8/2019 |

OTHER PUBLICATIONS

"Office Action Issued in Indonesian Patent Application No. P00201707980", dated Aug. 2, 2019, 3 Pages.

(Continued)

*Primary Examiner* — Hares Jami
(74) *Attorney, Agent, or Firm* — Klarquist Sparkman, LLP

(57) ABSTRACT

Systems and methods for extracting and sharing application-related user data are disclosed. A method may include extracting in-app data for at least one of the plurality of apps running on a computing device, the in-app data including content consumed by a user while the at least one app is running, and/or at least one user action taken in connection with the content. Using an entity template associated with the app, a plurality of text strings within the in-app data are classified into at least one of a plurality of data types specified by the template. At least one user data item (UDI) may be generated by combining at least a portion of the classified plurality of text strings, the at least one UDI being accessible by a second app, an operating system running on (Continued)

the, a service of the operating system, and/or a service running on at least another device.

20 Claims, 14 Drawing Sheets

Related U.S. Application Data

(60) Provisional application No. 62/162,594, filed on May 15, 2015.

(51) Int. Cl.
```
G06F 16/28       (2019.01)
G06F 16/2457     (2019.01)
G06F 9/445       (2018.01)
G06F 11/34       (2006.01)
G06F 11/30       (2006.01)
```

(52) U.S. Cl.
CPC ...... *G06F 11/3438* (2013.01); *G06F 16/2428* (2019.01); *G06F 16/24575* (2019.01); *G06F 16/285* (2019.01)

(58) Field of Classification Search
USPC ............... 707/737, 739, 740, 802, 803, 804
See application file for complete search history.

(56) References Cited

U.S. PATENT DOCUMENTS

| | | | | |
|---|---|---|---|---|
| 2012/0143677 | A1* | 6/2012 | Bruno | G06Q 30/0247 705/14.46 |
| 2012/0144384 | A1* | 6/2012 | Baek | G06F 11/302 717/173 |
| 2013/0227014 | A1* | 8/2013 | Song | H04L 67/025 709/204 |
| 2013/0332442 | A1* | 12/2013 | Liu | G06Q 30/0267 707/709 |
| 2014/0149579 | A1 | 5/2014 | Cotugno et al. | |
| 2014/0229408 | A1* | 8/2014 | Vijayaraghavan | G06Q 10/10 706/12 |
| 2014/0282219 | A1* | 9/2014 | Haddock | G06F 16/36 715/781 |
| 2015/0020083 | A1* | 1/2015 | Ben-Itzhak | H04N 21/818 719/320 |
| 2017/0083705 | A1 | 3/2017 | Lee et al. | |

OTHER PUBLICATIONS

"Office Action Issued in Colombian Patent Application No. NC2017/0011544", dated Jun. 27, 2020, 18 Pages.
"Office Action Issued in European Patent Application No. 16723875.7", dated Apr. 8, 2020, 6 Pages.
"First Office Action and Search Report Issued in Chinese Patent Application No. 201680028292.7", dated Apr. 8, 2020, 18 Pages.
"Second Office Action Issued in Chinese Patent Application No. 201680028292.7", dated Oct. 26, 2020, 20 Pages.
"Office Action Issued in European Patent Application No. 16723875.7", dated Jan. 11, 2021, 4 Pages.
"First Examination Report Issued in Indian Patent Application No. 201717038978", dated Feb. 5, 2021, 7 Pages.
"Office Action Issued in Chinese Patent Application No. 201680028292.7", dated Apr. 1, 2021, 12 Pages.

* cited by examiner

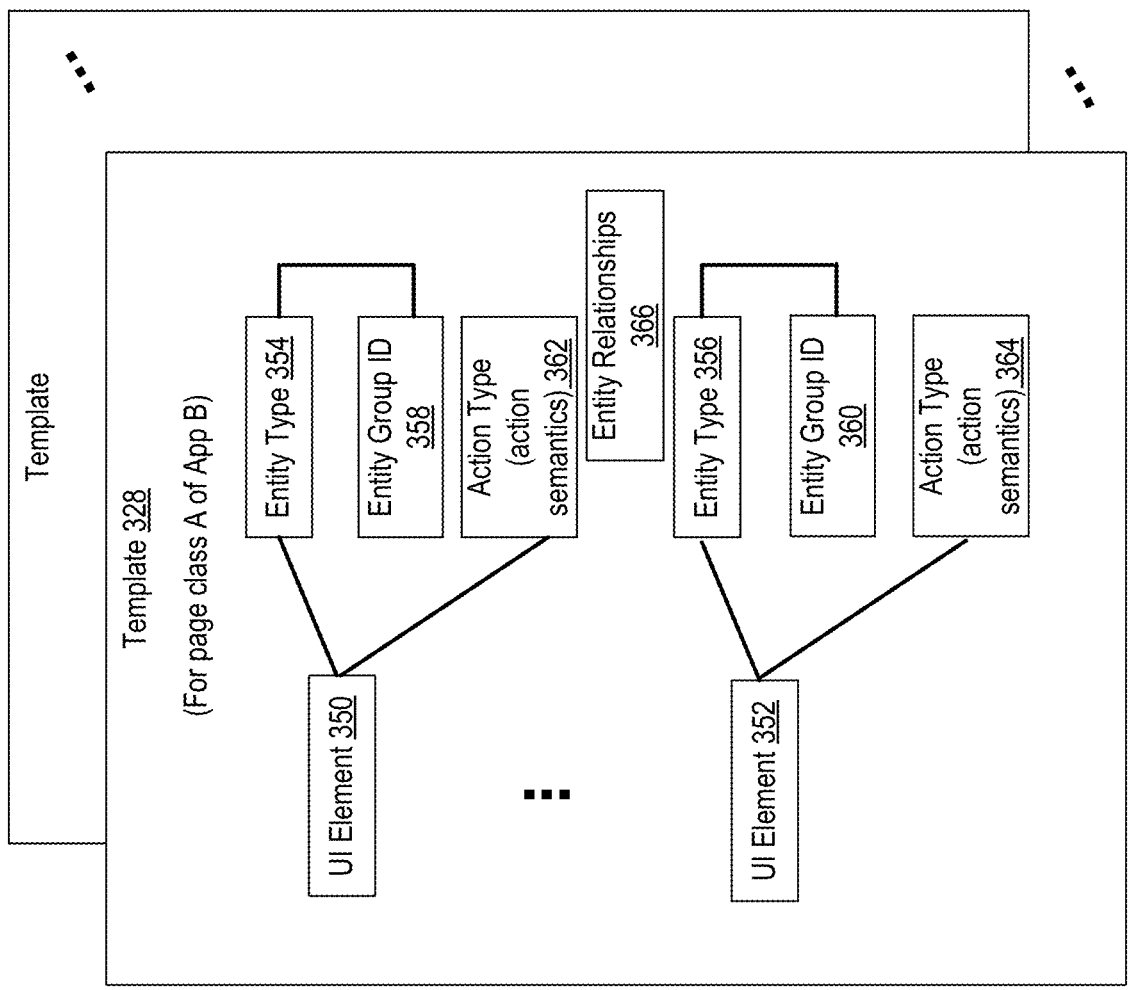

Fig. 6

```
.../Grid[0]/StackPanel[1]/StackPanel[0]/TextBlock[0] null null
.../Grid[0]/StackPanel[1]/StackPanel[0]/TextBlock[1] Restaurant Group14
.../Grid[0]/StackPanel[1]/StackPanel[1] Cuisine Group14
.../Grid[0]/StackPanel[1]/StackPanel[1]/TextBlock[2] Address Group14
.../Grid[0]/TextBlock[3] null null
.../Grid[1]/StackPanel[1]/StackPanel[0]/TextBlock[0] null null
.../Grid[1]/StackPanel[1]/StackPanel[0]/TextBlock[1] Restaurant Group15
.../Grid[1]/StackPanel[1]/StackPanel[1] Cuisine Group15
.../Grid[1]/StackPanel[1]/StackPanel[1]/TextBlock[2] Address Group15
.../Grid[1]/TextBlock[3] null null
.../Grid[2]/StackPanel[1]/StackPanel[0]/TextBlock[0] null null
.../Grid[2]/StackPanel[1]/StackPanel[0]/TextBlock[1] Restaurant Group16
.../Grid[2]/StackPanel[1]/StackPanel[1] Cuisine Group16
.../Grid[2]/StackPanel[1]/StackPanel[1]/TextBlock[2] Address Group16
.../Grid[2]/TextBlock[3] null null
```

Table 1

| | | |
|---|---|---|
| | getCurrentView() -> view | get content on screen |
| | getEntities(view) -> [entity] | |
| OS | getAction(view) -> action | |
| | getName(entity\|action) -> name | e.g., "Nara" |
| | getType(entity\|action) -> type | e.g., "restaurant name" |
| | getGroupId(entity) -> groupId | used to aggregate entities |
| | subscribeToView(listener,filter) | filter is optional |
| | unsubscribeFromView(listener) | |
| | queryBDI(query):cursor | SQL-like query |

Table 2

| | | | |
|---|---|---|---|
| OS | Context Notifications | As content is consumed in apps, relevant info is extracted and notifications (e.g., new contact, upcoming driving destination) are fired. | Android |
| | Contextual Menu | This library provides context-sensitive pop-up menus in an app without any developer effort. When a user selects a song or a restaurant name in an app, the library pops up a menu with options to purchase the song from Amazon or to call the restaurant. Menus are built through app instrumentation, but the OS would ideally generate them. Appstract notifies the menu service when a UI element is tapped and provides the entity type of its content, such that the right menu for such content is displayed. Figure 4(b) shows a SaveContactTask menu in Urbanspoon. | Windows Phone |
| | App-tasker | Automatic creation of task templates for accessibility services and personal digital assistants. | Android |
| | RankedList | A new UI Element for easily ranking items in a List. | Android |
| 1st party app | Cortana-AppsForYou | We extended Cortana to provide app recommendations based on music interests. As an example (Figure 4(c)), the user frequently selected the Toddler station in Pandora and liked some of the songs. Cortana queries the Analytics Store for recently-listened music BDIs and infers the user may be interested in apps in the Kids and Family category. | Windows Phone |
| | Dinner Memex | Mashup of info (recipes, music, etc.) collected from various apps about a dinner plan. The developer simply specifies the mashup object and it is automatically populated with matching entities as the user interacts with her apps. | Android |
| 3rd party app | MusicNews Reader | Ranking of music news based on artist preferences. Implemented using RankedList. | Android |
| | Recipes By Restaurants | Yelp is restaurant app and MSN Food & Drink is a recipe app. We modified the Food & Drink app (by adding only 6 lines of dalvik bytecode) to rank recipe results based on restaurant cuisine types (we used the SQL query in x5.2). | Android |

Fig. 7

SYSTEM AND METHOD FOR EXTRACTING AND SHARING APPLICATION-RELATED USER DATA

CROSS-REFERENCE TO RELATED APPLICATIONS/INCORPORATION BY REFERENCE

This application is a continuation of U.S. application Ser. No. 14/734,991, filed Jun. 9, 2015, which application makes reference to, and claims priority from, U.S. Provisional Application Ser. No. 62/162,594, filed on May 15, 2015, entitled "SYSTEM AND METHOD FOR EXTRACTING AND SHARING APPLICATION-RELATED USER DATA," which applications are incorporated herein by reference in their entirety.

BACKGROUND

At least some time spent on mobile devices is spent using applications (or "apps"). Some known apps are isolated programs that display content as a set of pages that a user can interact with and navigate between. The functionality of at least some known apps is limited to displaying content expressly requested by the user.

Known methods and systems for tracking and/or analyzing user interaction with an app include manually annotating the app. Manually annotating the app, however, requires additional programming time and/or effort and may be time consuming, tedious, and/or error-prone. Moreover, known methods and systems for tracking and/or analyzing user interaction, particularly when done with little to no developer effort, are computation-heavy and require a large amount of memory when stored locally or impose network overhead and potentially violate user privacy when executed on remote servers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a computing device may include a processing unit and a memory storing a plurality of applications (apps). The computing device may be configured to perform operations for extracting and sharing application-related user data. The operations may include extracting in-app data for at least one of the plurality of apps running on the computing device, the in-app data including content consumed by a user while the at least one app is running, and/or at least one user action taken in connection with the content. The operations further include using an entity template associated with the at least one app, classifying a plurality of text strings within the in-app data into at least one of a plurality of data types specified by the entity template. At least one user data item (UDI) may be generated by combining at least a portion of the classified plurality of text strings the at least one UDI being accessible by at least one of the following: a second app of the plurality of apps, an operating system running on the computing device, a service of the operating system, and/or a service running on at least another device.

In accordance with one or more aspects, a method for extracting and sharing application-related user data may include, using a tracer component within the operating system of the computing device and while an application is running on the computing device, detecting a user interface (UI) event triggered by a user action in connection with a page class of the application, the UI event associated with a UI tree of the page class. Using an analyzer component within the operating system of the computing device, a plurality of templates associated with the application running on the computing device is received, each of the plurality of templates including a plurality of entity types and action types. A plurality of text strings within the UI tree may be matched with at least one of the plurality of templates to classify the plurality of text strings in the UI tree with at least an entity type of the plurality of entity types or an action type of the plurality of action types. A behavioral data item (BDI) by combining at least a portion of the classified plurality of text strings within the UI tree. The generated BDI is provided to at least one of the following: another application running on the client device, one or more services running on the client device, and/or another device.

In accordance with one or more aspects, a system for extracting and sharing application-related user data in a client device is disclosed and may include a tracer service operable to detect a user interface (UI) event triggered by a user action in connection with a page class of an application, the UI event associated with a UI tree of the page class while the application is running. The system may include an analyzer service operable to match a plurality of texts within the UI tree with at least one of a plurality of templates for the application, to classify the plurality of texts in the UI tree with at least a name, a data type, and a group identification, and generate at least one user data item (UDI) by combining at least a portion of the classified plurality of entities within the UI tree that are associated with the at least one user action and are related (e.g., have the same group identification). The system may also include a store service operable to store the generated at least one UDI in network storage and provide access to the stored at least one UDI to at least another application running on the client device.

As described herein, a variety of other features and advantages can be incorporated into the technologies as desired.

BRIEF DESCRIPTION OF THE DRAWINGS

FIG. 3B is a schematic diagram illustrating example templates, which may be used by the analytics service of FIG. 3A, in accordance with one or more embodiments.

FIG. 6 illustrates portion of an example entity template of a dining-related app, in accordance with one or more embodiments.

FIG. 7 illustrates a first table with an example API for accessing the analytics service of FIG. 3A, and a table with example use cases that can be implemented in an Android or Windows Phone environment using the analytics service of FIG. 3A, in accordance with one or more embodiments.

DETAILED DESCRIPTION

Figure 1:
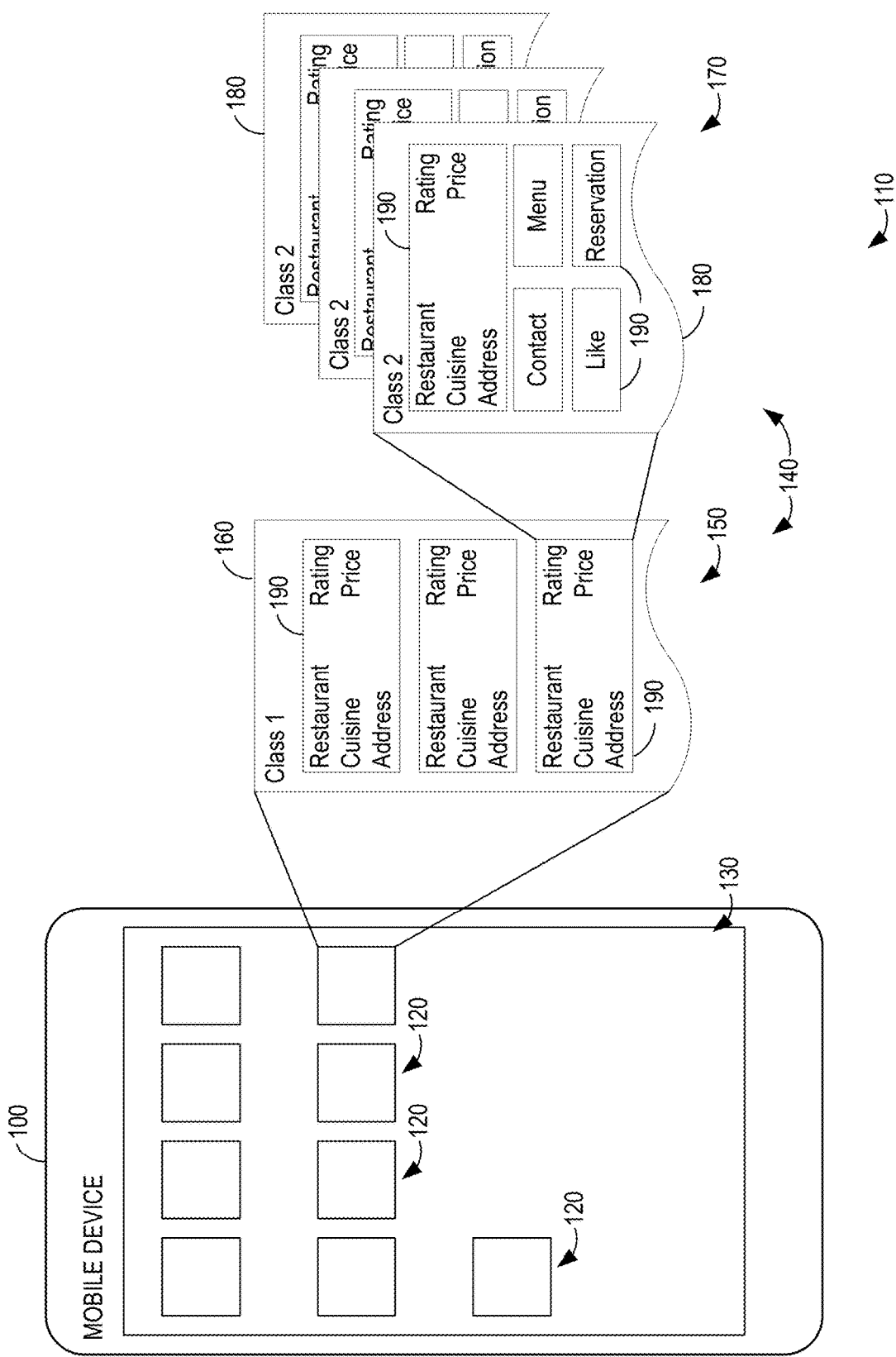
FIG. 1 is a schematic diagram illustrating an exemplary mobile device including one or more applications that may be implemented on the mobile device.

What a user does in an app (e.g., browsing specific types of restaurant, selecting a "Like" to express a positive preference for a restaurant, etc.) reflects the user's interests and preferences. Such in-app user data may be used as behavioral analytics data and can be key to providing personalized user experiences and new functionality. However, the high developer effort that may be necessary to extract analytics information prevents its widespread use, and the siloed nature of modern apps restricts its utility.

Despite their value, in-app behavioral analytics are rarely used today. There are two key reasons. First, the cost and complexity of extracting the information is high, even for an experienced app developer—she needs to carefully instrument her code to capture user activities within an app, and then to infer semantically meaningful information about the activities. The latter includes both the semantics of what content a user consumes in the app (e.g., a vegetarian restaurant) and how she interacts with it (e.g., she views the menu or reserves a table). Existing in-app analytics systems are not sufficient for this purpose as they fall short of automatically providing semantic information, which is key to behavioral analytics. For example, they can log a click event, but fail to report that it is on a "Like" button associated with a restaurant.

Second, due to security and privacy reasons, apps today work in silos. Mobile operating systems (like iOS and Windows Phone) do not allow apps to locally share data. Hence, even if an app could capture users' in-app behavior, the information could not be accessed by another app. Even if the apps could share data, the lack of a central service that co-ordinates exchange of behavioral data may harm interoperability. This siloed structure limits the utility of behavioral analytics—since a typical app observes only a narrow aspect of a user's activities, for short time. Aggregating information from multiple apps can provide a holistic and more accurate view of a user's behavior, and sharing the data among apps can enable new functionality. For instance, a recipe app (such as Epicurious) can suggest Japanese recipes to a user based on the information that she repeatedly searched Japanese restaurants in a restaurant app (such as Yelp). A novel app, nonexistent today due to siloed app data, can aggregate or mashup all digital media (e.g., songs, movies, books, etc.) the user consumes in various apps, such as Pandora and Netflix, so that the user can later search them in one place. The information can also benefit first party services of today's mobile OSes, such as personal digital assistants (Siri, Cortana, Google Now). When a user asks the digital personal assistant to call a restaurant or to order a pizza, the assistant can use the user's activities within restaurant booking apps or recipe apps to automatically decide what type of or specific restaurants to call (several examples of new use cases of technologies described herein are illustrated in table 2 of FIG. 7).

In accordance with techniques described herein, an analytics service (which includes a tracer component, an analyzer component, and a store component) may be used to extract and share app-related user data (e.g., behavior analytics data). The analytics service may be implemented as, e.g., part of the device OS to extract behavioral information by analyzing in-app interactions, and making the information available across apps, without developer effort and without exfiltration of user data. More specifically, the service may implement a two-phase algorithm. It replaces expensive entity extraction tasks on the mobile device with simple matching of entity templates, which are automatically computed by expensive text mining algorithms offline, in the cloud, and in a user-agnostic way. Additionally, an abstraction of analytics data that enables useful sharing of the data across apps is provided. The analytics service represents the content of each UI element within an app as an entity, which consists of a name and additional metadata, such as the type of the thing the name refers to. However, simply extracting all entities in an app page is not sufficient since only a subset of them may be relevant to the user. The analytics service, therefore, combines entities with user actions to generate behavioral data items (BDIs) (also referred to as user data items, UDIs). Actions as well as other usage statistics (e.g., whether the user tapped on an entity, how much time the user spent interacting with the entities) allow to infer a user's interest in them.

Entities in the same page may be related; for example, a restaurant name, its address, and its phone number are all related. The analytics service captures such relationships to enable an app to automatically complete a task (e.g., calling a given restaurant). The analytics service stores the behavioral data (e.g., BDIs/UDIs) collected from all apps in an OS-protected analytics store that apps (with permission) can programmatically query (e.g., using a SQL-like declarative language). The analytics service may also provide APIs for the OS, OS services, and apps to consume the behavioral information (e.g., the BDIs) from the analytics store or from another store (e.g., a cloud BDI/UDI store).

The behavioral/user app-related data (e.g., BDI/UDI) extracted, aggregated, and shared by the analytics service may enable one or more of the following scenarios. First, it would enable new OS features. When a user selects some text on a screen (inside an app), the OS would automatically display a contextual menu, which gives options to "make a call" or to "purchase from online store" depending on whether the selected text is a phone number or a song, respectively. Another scenario is task completion, where the OS automatically learns the sequence of UI actions needed to complete a task such as booking a restaurant and can replay the macro by using an accessibility-like service.

Second, the analytics service would help OS-provided first party apps provide personalized experiences. A personal digital assistant (e.g., Cortana, Siri, Google Now) could recommend apps based on how the user interacts with third party music apps. The digital assistant would also know which restaurant the user is referring to when the user browses a restaurant name in an app and says "Cortana, make a reservation for this".

Finally, behavioral data from the analytics service (e.g., BDIs/UDIs) would enable novel features in existing third party apps (e.g., a food app would rank recipes based on cuisines and restaurants the user browses in other apps). The analytics service may also enable new types of app, e.g., for automatic mash up of all information collected from various apps about a dinner plan or an upcoming trip.

The analytics service disclosed herein uses automated entity extraction techniques and may be implemented as an OS service. To address the efficiency-privacy tradeoffs of existing entity extraction techniques, the analytics service may implement a device-cloud hybrid approach using an analytics engine (e.g., a tracer and an analyzer as described herein below), which captures app contents and user's in-app activities and infers their semantics, and an analytics store, which stores behavioral data from multiple apps and provides abstractions for the OS or first- and third-party apps to access them programmatically.

FIG. 1 is a schematic diagram illustrating an exemplary mobile device 100 including one or more applications ("apps") 110 that may be implemented on the mobile device. In some examples, the mobile device 100 presents an icon 120 for each app 110 on a user interface 130 (e.g., a touch screen display) that enables the app 110 to be executed on the mobile device 100. Mobile device 100 may include any number of apps 110 that enable the mobile device 100 to function as described herein.

An app 110 includes one or more page classes 140, each of which is instantiated by one or more pages. In some examples, each page includes one or more user-interface (UI) elements 190. Example UI elements 190 include buttons, textboxes, lists, and images. In at least some examples, the UI elements 190 include and/or are associated with content (e.g., a textbox includes and/or is associated with a text string). In at least some examples, a UI element 190 is nested within another UI element 190. For example, a "parent" UI elements 190 (e.g., a list) includes and/or contains one or more "child" UI elements 190 (e.g., a textbox) within the parent UI element 190. Some UI elements 190 (e.g., buttons) are interactive and have associated event handlers. For example, a user interacts with and navigates between pages of the app 110 by interacting with UI elements 190 and a back button provided on at least some mobile devices 100.

In some examples, content is arranged on a page based on a UI layout or structure defined in its page class 140. For example, pages instantiated from the same page class 140 have the same UI structure but potentially different content. In this example, a restaurant booking app 110 includes two page classes 140: a first class ("Class 1") 150 associated with one or more first pages 160 showing a list including a plurality of restaurants, and a second class ("Class 2") 170 associated with one or more second pages 180 showing detailed information associated with a restaurant. Apps 110 may include any number of page classes 140 that enables the app 110 to function as described herein.

In this example, the first page 160 includes UI elements 190 that enable a restaurant to be selected from the list of restaurants, and the second page 180 includes UI elements 190 that enable information to be viewed, the restaurant to be contacted, a menu to be viewed, the restaurant to be endorsed or "liked", and/or a reservation to be made. In this example, the first page 160 may be instantiated to show a list of restaurants proximate to, for example, a current location of the mobile device 100, and the second page 180 may be instantiated to display detailed information associated with a restaurant selected, for example, from a list shown on a first page 160. Each page is able to be instantiated any number of times that enables the app 110 to function as described herein.

Figure 2:
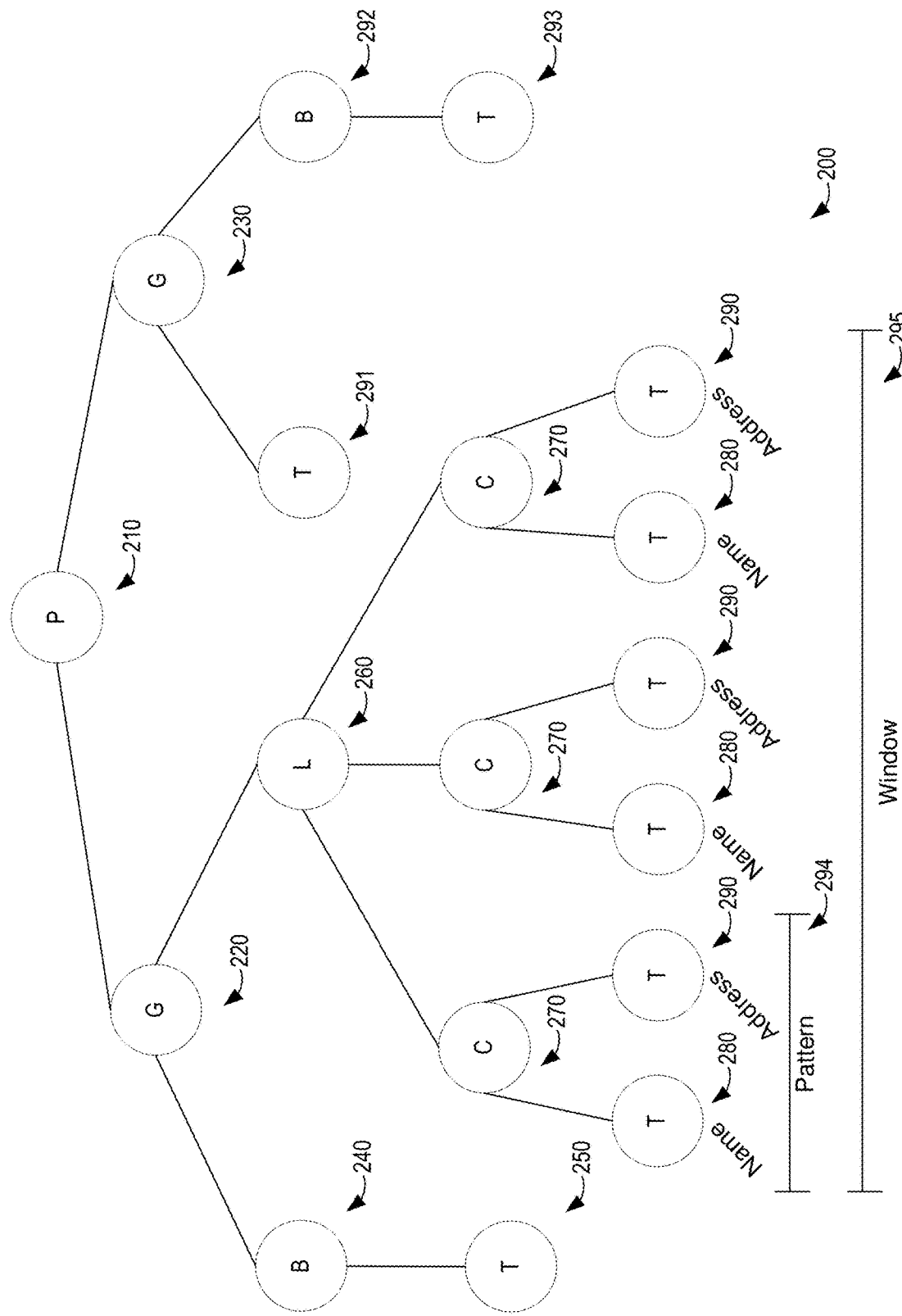
FIG. 2 is a schematic diagram illustrating relationships between elements of an application such as shown in FIG. 1.

FIG. 2 is a schematic diagram illustrating relationships between UI elements 190 (shown in FIG. 1) included in an app 110 (shown in FIG. 1). The user interacts with or visits a UI element 190 within an app 110. In this example, the UI elements 190 are schematically arranged as nodes in a tree 200. The app 110 includes one or more pages 210, such as the first page 160 or the second page 180. In this example, a page 210 includes a first table or grid 220 and a second table or grid 230. For example, a child UI element 190 (e.g., the first grid 220 or the second grid 230) is contained within its parent UI element 190 (e.g., the page 210).

In this example, the first grid 220 includes a button 240 including text 250 and a list 260 including a plurality of custom arrangements 270. In this example, each custom arrangement 270 includes a first text 280 (e.g., a name) and a second text 290 (e.g., an address). In this example, the second grid 230 includes a table 291 and a button 292 including text 293.

At least some apps 110 include a repeated sequence or pattern 294 of a plurality of UI elements 190. In this example, each custom arrangement 270, which includes a respective first text 280 and a respective second text 290, is identified as a pattern 294. Moreover, at least some apps 110 include a repeated sequence or pattern window 295 including a plurality of patterns 294. In this example, a list-like structure of homogenous objects (e.g., patterns 294) is identified as a pattern window 295.

Figure 3A:
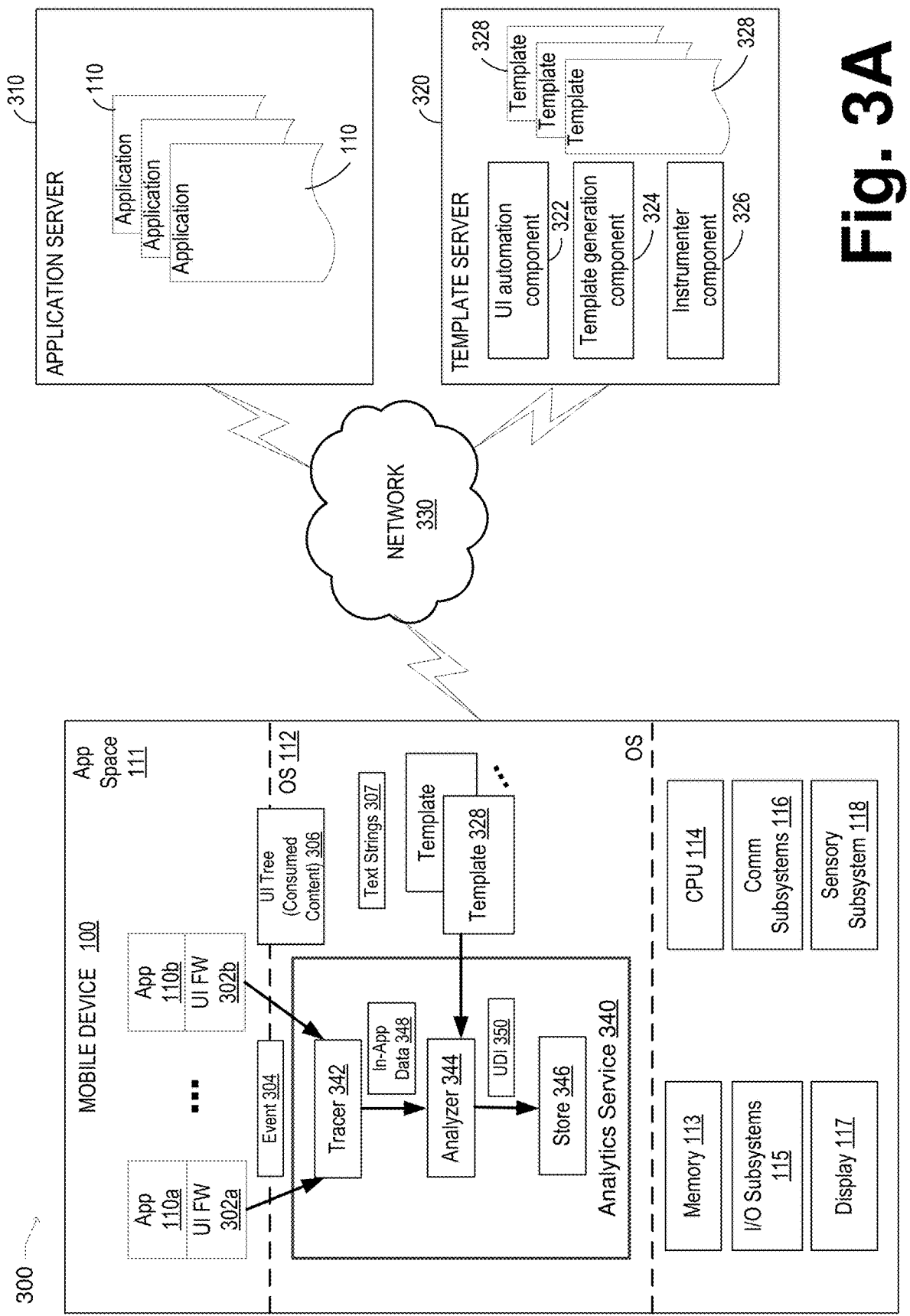
FIG. 3A is a schematic diagram illustrating an example system including one or more mobile devices, such as the mobile device shown in FIG. 1 which includes an analytics service, and one or more servers communicatively coupled to the one or more mobile devices.

FIG. 3A is a schematic diagram illustrating an example system 300 including one or more mobile devices, such as the mobile device shown in FIG. 1 which includes an analytics service, and one or more servers communicatively coupled to the one or more mobile devices. More specifically, the system 300 includes a mobile device 100, an application server 310 (e.g., a marketplace for apps), and a template server 320 communicatively coupled to each other via a network 330. Communication between the mobile device 100, the application server 310, and the template server 320 may occur using any protocol or mechanism over any wired or wireless connection. In this regard, the network 330 may include one or more of the Internet, a wireless network, and/or a wired network.

In this example, the application server 310 is configured to provide and/or store one or more apps 110. The apps 110 are configured to provide a functionality to the mobile device 100. Example apps include mail application programs, web browsers, calendar application programs, address book application programs, messaging programs, media applications, location-based services, search programs, and the like. The apps 110 may communicate with counterpart apps or services such as web services accessible via the network 330. For example, the apps 110 may represent client-side apps on the mobile device 100 that correspond to server-side services executing in the cloud and/or server-side components stored in the cloud, the application server 310, the template server 320, and/or other memory area accessible by the mobile device 100. Such examples reduce the computational and storage burden on the mobile device 100.

In this example, the template server 320 is configured to provide and/or store one or more templates 328. In at least some examples, one or more templates 328 are generated by the template server 320 and/or made available for download with the app 110 at the application server 310. Structural properties of the app 110 (e.g., the UI structure) are exploited to annotate the app 110 with semantic information (e.g., metadata such as entity type) that remains valid during runtime. Each template 328 includes a plurality of entities that are associated with UI elements 190. At least some UI elements 190 are associated with a single entity. Example single-entity UI elements 190 include textboxes including text for one type of information (e.g., a restaurant name, an address, a telephone number). Each single-entity UI element 190 is independently customizable and, thus, assignable with precise semantics. In some examples, text of each UI element is associated with a name, a variety of related metadata, and/or usage information. In some examples, the templates 328 are configured to provide at runtime context to user interactions with the apps 110 and, thus, enable the apps 110 to be more efficiently and effectively exploited, with low overhead on the mobile device 100.

In some examples, the template 328 is updated when and/or after the app 110 is updated. For example, the update to the app 110 is detected and/or identified by the mobile device 100, and the associated template 328 is automatically requested and/or downloaded by the mobile device 100 based on the identification of the app update. In another example, an updated app 110 is detected and/or identified to be on the mobile device 100 by the template server 320, and the updated template 328 is automatically generated by the template server 320 based on the identification of the updated app 110. In yet another example, an updated template 328 is associated with an updated app 110 prior to the updated app 110 being downloaded by the mobile device 100, and the updated template 328 is downloaded by the mobile device 100 concurrently with or after the updated app 110. Alternatively, the app 110 and the template 328 may be updated and/or downloaded by or from any computing device and at any time that enables the system 300 to function as described herein.

In some examples, the template server 320 includes a UI automation component 322, a template generation component 324, and an instrumenter component 326. The UI automation component 322 is configured to automatically navigate the app 110 and capture and/or log one or more user interactions with one or more UI elements 190 from the app 110 in a user-agnostic manner and/or without human involvement. The template generation component 324 is configured to extract the UI elements 190 and contained text, associate the UI elements 190 with entities, and generate templates 328 including a mapping of the UI elements 190 with the associated entities. The instrumenter component 326 is configured to inject logging code into the apps 110. At least some templates 328 and logging code are injected into the application binary code on the mobile device 100 to enable an app 110 to extract one or more entities during runtime. Alternatively or in addition, the templates 328 and/or the logging code may be injected at any level that enables the apps 110 to function as described herein. In at least some examples, the templates and/or logging code are injected without additional developer input, such that the mobile device 100 is configured to perform the function as described herein without modifying the underlying app 110.

In this example, the mobile device 100 is configured to retrieve and/or download one or more apps 110 from the application server 310 and/or one or more templates 328 from the template server 320, and locally store the one or more apps 110 and one or more templates 328 at the mobile device 100. In at least some examples, the application server 310 retrieves and/or downloads one or more templates 328 from the template server 320, and the mobile device 100 retrieves and/or downloads one or more apps 110 and their respective templates 328 from the application server 310. In some examples, the mobile device 100 includes an entity extraction component, such as analytics service 340 configured to log user interactions and analyze the user interactions using the templates 328. In at least some examples, an entity contained in a UI element extracted using the template 328 includes a name and a list of key-value pairs indicating various semantic information of the content, as well as syntactical information about where the entity appears in the application. For example:

name='Izumi',
info={type='restaurant',cuisine='Japanese', price='cheap'},
app='[Restaurant application name]', appPage=0xAD4352, uiElement=0x3425A The extracted entities may be stored in an entity table that operating system (OS) services and other apps 110, if granted permission, may query by using, for example, standard structured query language (SQL) query. For example:

SELECT cuisine FROM [Application name]
WHERE info.type='restaurant'
AND interaction.num_taps>10

Referring to FIG. 3A, the mobile device 100 may comprise suitable circuitry, interfaces, logic and/or code and may include an application space 111, an operating system 112, a memory 113, a CPU 114, Input/Output (IO) subsystems 115, communication subsystems 116, display 117, and a sensory subsystem 180.

One or more of the apps 110 can be downloaded and installed in the app space of device 100, as apps 110a, . . . , 110b. Each of the apps may include a user interface (UI) framework 302a, . . . , 302b, respectively, which may allow one or more other components of device 100 (e.g., the analytics service 340) to subscribe for and get notifications upon occurrence of a UI event (e.g., a user using the app touches on a button, enters text, scrolls, likes a page, etc.)

The analytics service 340 may comprise suitable circuitry, interfaces, logic and/or code and may be operable to log user interactions with one or more of the apps 110a, . . . , 110b, analyze the user interactions using the templates 328, and extract one or more user data items 350, which may be stored in the store 346. The analytics service 340 may include a tracer component 342, an analyzer component 344, and a store component 346. The tracer 342 and the analyzer 344 are referred herein as an "analytics engine." The tracer 342 may be operable to capture raw application content (e.g., in-app data 348), which may include one or more events 304 (e.g., user action such as button click, pressing a Like button, etc.) and a UI tree 306 with one or more text strings 307 (the UI tree may include the content consumed by a user in a given page class of an app, including text strings in that page class; e.g., a user may like a restaurant showing on a given restaurant app page, and the restaurant name will be a text string 307, the like action can be the event 304, and the page class where the Like action was entered can be the UI tree 306). The tracer 342 communicates the in-app data 348 to the analyzer 344 for further processing and generation of the user data item (UDI) 350, using one or more of the templates 328. The UDI may be also referred to as a Behavioral Data Item (BDI).

After the one or more UDIs 350 are generated, they can be stored in a store 346, which can be accessed by one or more other applications, the OS 112, a service of the OS 112, or another device (e.g., server 310) so that UDI content is shared between applications, services and devices.

Figure 4:
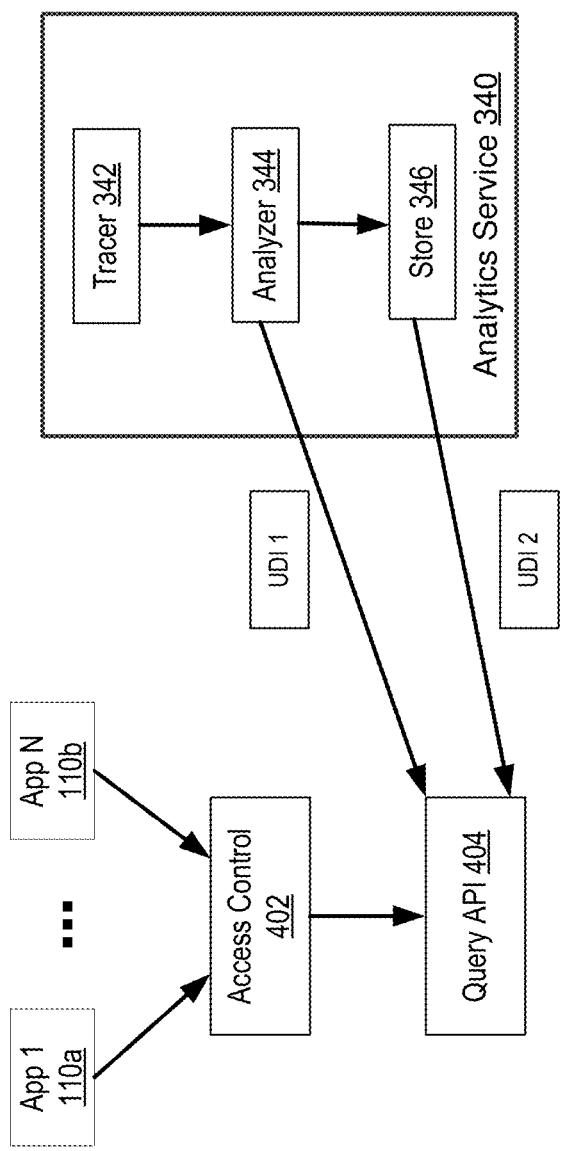
FIG. 4 is a schematic diagram illustrating example API use for accessing user data items (UDIs) from the analytics service, in accordance with one or more embodiments.
Figure 5:
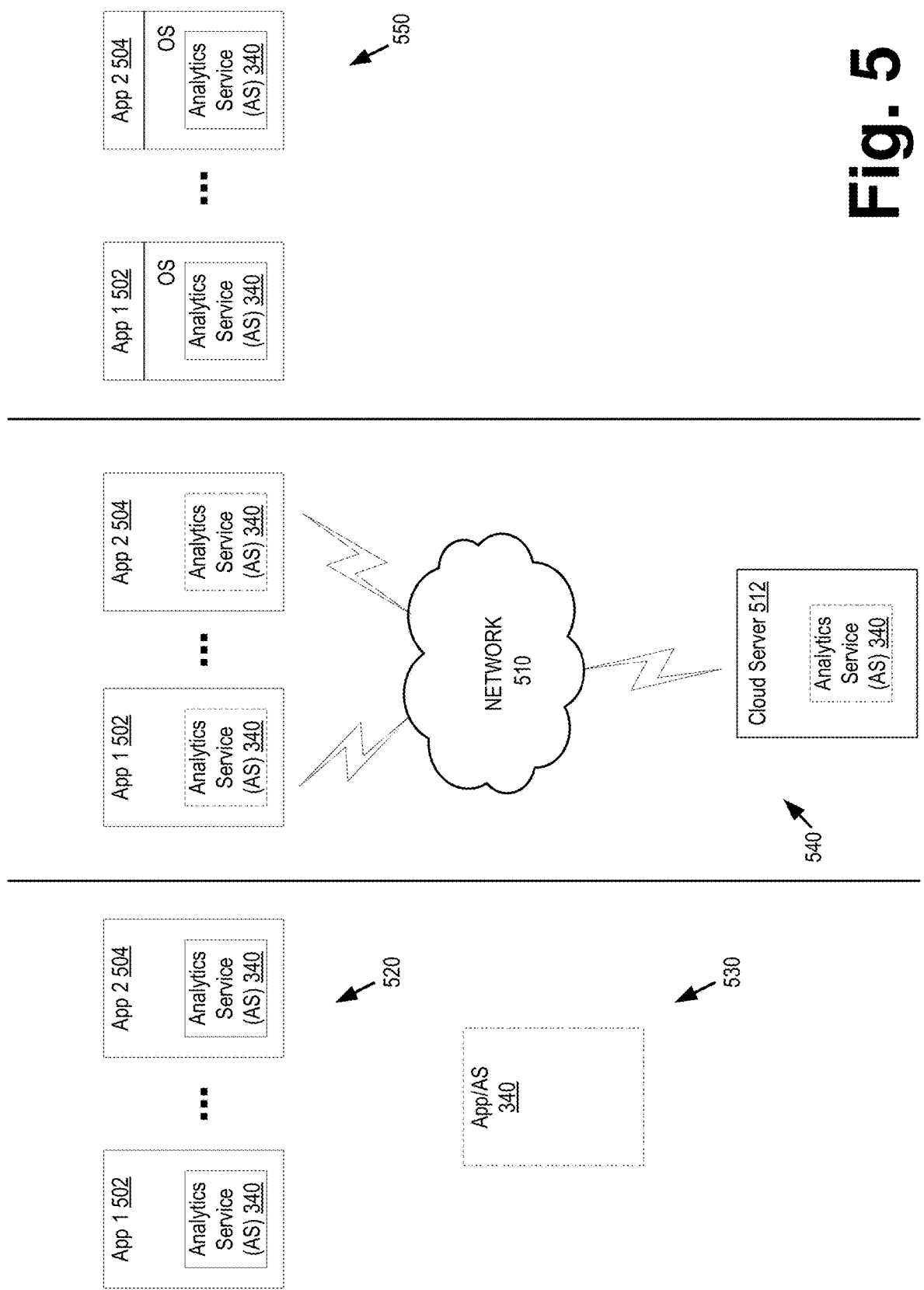
FIG. 5 is a schematic diagram illustrating example implementations of the analytics service, in accordance with one or more embodiments.

The store 346 may be implemented at the device 100 (i.e., locally) and/or in the cloud (e.g., at the cloud server such as 512 in FIGS. 5, 310 and/or 320). The store 346 at device 100 stores the UDIs 350 associated with usage of the apps 110 at device 100. However, if the store is implemented in a cloud server, then the store 346 may store UDIs associated with application use not only at device 100 but at a plurality of other devices (of the same or different users). In this regard, the store 346 may additionally provide access to UDIs to apps, OS, OS services from the same device 100 and/or from other devices (of the same user or different users). Access to the UDI information may be provided using an API and upon access authentication (as illustrated in FIG. 4). In accordance with one or more embodiments, the store 346 may also provide UDIs automatically to one or more apps 110, the OS 112, an OS service (e.g., a digital personal assistant that may be an OS service or a stand-alone app), and/or one or more other devices that have pre-authorized access and have a subscription to one or more types of UDIs.

The main processor 114 may comprise suitable logic, circuitry, interfaces, and/or code that may be operable to process data, and/or control and/or manage operations of the computing device 100, and/or tasks and/or applications performed therein in connection with extracting and sharing of application-related data functions described herein. In this regard, the main processor 114 may be operable to configure and/or control operations of various components and/or subsystems of the computing device 100 by utilizing, for example, one or more control signals. The main processor 114 enables running and/or execution of applications, programs and/or code, which may be stored, for example, in the system memory 113. In some instances, one or more of the applications running and/or executing on the computing device 100 (e.g., the apps 110a, . . . , 110b) may generate and/or update video content that may be rendered via the display 117.

The system memory 113 may comprise suitable logic, circuitry, interfaces, and/or code that may enable permanent and/or non-permanent storage, buffering, and/or fetching of data, code and/or other information, which may be used, consumed, and/or processed. In this regard, the system memory 113 may comprise different memory technologies, including, for example, read-only memory (ROM), random access memory (RAM), Flash memory, solid-state drive (SSD), and/or field-programmable gate array (FPGA). The system memory 113 may store, for example, configuration data, which may comprise parameters and/or code, comprising software and/or firmware.

The communication subsystem 116 may comprise suitable logic, circuitry, interfaces, and/or code operable to communicate data from and/or to the computing device 100, such as via one or more wired and/or wireless connections and the network 330. The communication subsystem 116 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing device 102, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 116 may provide wired and/or wireless connections to, for example, the servers 310, 320, via the network 330. The network 330 may include the Internet and/or one or more wired and/or wireless networks.

The sensory subsystem 180 may comprise suitable logic, circuitry, interfaces, and/or code for obtaining and/or generating sensory information, which may relate to the computing device 100, its user(s), and/or its environment. For example, the sensory subsystems 180 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 115 may comprise suitable logic, circuitry, interfaces, and/or code for enabling user interactions with the device 100, enabling obtaining input from user(s) and/or to providing output to the user(s). The I/O subsystem 115 may support various types of inputs and/or outputs, including, for example, video, audio, and/or textual. In this regard, dedicated I/O devices and/or components, external to or integrated within the computing device 100, may be utilized for inputting and/or outputting data during operations of the I/O subsystem 115. Exemplary I/O devices may comprise one or more built-in cameras (e.g., front-facing and/or rear-facing camera), one or more displays (e.g., display 117), mice, keyboards, touchscreens, voice input interfaces, and other input/output interfaces or devices. With respect to video outputs, the I/O subsystem 115 may be operable to generate and/or process video content, graphics, and/or textual data, and/or generate video frames based thereon for display, via the display 117 for example.

The display 117 may comprise suitable logic, circuitry, interfaces and/or code that may enable displaying of video content, which may be handled and/or processed via the I/O subsystem 115.

FIG. 3B is a schematic diagram illustrating example templates, which may be used by the analytics service of FIG. 3A, in accordance with one or more embodiments. Referring to FIG. 3B, an example template 328 may be generated for a given page class (e.g., page class A) of a given app (e.g., App B). The template 328 may include a plurality of UI elements 350, . . . , 352, each UI element comprising an entity type (e.g., 354, . . . , 356) and an associated entity group identification (e.g., 358, . . . , 360). The UI elements may also comprise an action type information (or action semantics information) 362, . . . , 364. FIG. 6 illustrates portion of an example entity template of a dining-related app, in accordance with one or more embodiments.

In accordance with one or more embodiments, the template 328 may comprise entity relationship information 366. The entity relationships 366 may indicate relationships among two or more of the entities (or UI elements) 350, . . . , 352. The group identification information 358, . . . , 360 may be one type of entity relationship information 366. However, the entity relationship information 366 may also indicate other types of a relationship, such as a direct/explicit relationship. For example, the entity relationship information 366 may indicate an explicit relationship between an entity "Burger King" and an entity "fast food restaurant" (i.e., "Burger King" is a "fast food restaurant").

Analytics Engine (Tracer 342 and Analyzer 344).

At a high level, the analytics engine (342 and 344 collectively) performs two tasks: (1) capturing raw app contents and in-app user actions on the fly (by the tracer 342), and (2) inferring semantics of the contents and actions (by the analyzer 344).

The task of capturing raw app content and user actions can be done automatically by instrumenting apps or by using accessibility services provided by the OS (e.g., using the UI frameworks 302a, ..., 302b of the apps 110). In both cases, the analytics service 340 can capture all UI elements and contents (of an app) currently displayed on the device screen (e.g., UI tree 306 and text strings 307) as well as all user actions such as taps and page transitions (e.g., events 304).

Contents captured in the above step may lack semantics. The task of inferring semantics is more involved and is performed by the analyzer 344. The key challenge is to accomplish a low-overhead on-device service that performs entity extraction analysis without offloading the task to the cloud (privacy and low overhead) nor to the developer (zero-developer effort). Our solution to this problem comes from two key observations on how mobile apps display contents.

As a way of background, modern mobile apps display content organized as a set of pages that a user can interact with and navigate between. A typical app consists of a small number of page classes, each of which can be instantiated as many page instances (or pages, in short) with different contents (e.g., in a restaurant app, the details for Nara and Izumi restaurants are shown in two separate instances of the "RestaurantDetails" page class). Each page displays content according to the UI layout defined in its page class. An app page has a set of UI elements such as buttons, textboxes, lists, and images. Elements in a page are organized in a UI tree (like a DOM tree), where nodes are UI elements and a child element is contained within its parent element. Some UI elements (e.g., buttons) are interactable and have associated event handlers.

With the above terminology, we observe the following:

Singleton entities.

Many UI elements contain single entities. For example, the title TextBlock in a page often contains one type of information, e.g., name of a restaurant. In fact, developers tend to put various types of information such as restaurant name, address and phone number in different UI elements so that they can be independently customized for looks and tap actions. This makes it possible to assign precise semantics to those UI elements.

Few, stable UI structures.

App pages are instantiated from a small number of page classes. This makes it possible to cover all UI elements in an app by annotating UI elements in that small number of page classes. Moreover, the annotation remains stable over time: a UI element annotated as restaurant can be instantiated during run time with potentially an infinite number of names, all of which will be restaurant. This implies that UI elements can be annotated once offline and be repeatedly used later during runtime. This process happens without developer (nor user) involvement, so it can be executed offline, and hence can be expensive.

The above observations lead to the novel two-stage architecture of the analytics service 340, as shown in the figures.

Given an app from which we want to extract behavioral analytics, offline and without any user involvement, the analytics service 340 automatically executes the app with a UI Automation system that automatically interacts with the app to navigate through various app pages and captures all contents displayed by the app during runtime. Data include contents a user consumes on various app pages (e.g., text contained in the ListItems of a List UI element) and user actions (e.g., taps of various UI elements). The Template Generation module 324 processes these raw contents by using complex entity extraction techniques to produce an entity template for each page class in the app. A page template is a list of UI elements annotated with their semantic categories, or entity types (e.g., restaurant name, song title, recipe name, etc.).

Online, on-device, stage: At runtime, the tracer 342 captures raw in-app data as mentioned herein. Data collected has a similar format as that generated by the UI automation module offline, but here the captured content is user-generated, hence possibly privacy-sensitive. Data is analyzed (by the analyzer 344) as soon as it is captured, as follows. First, for each app page, using the entity templates, all texts appearing in the raw data are classified into pre-defined categories such as names of businesses, persons, or locations. Second, by using the template, various categorized texts can be grouped such that each group represents one logical entity. For example, a restaurant name, its address and its phone number, can all be combined into one entity. In this regard, using the entity templates 328, the online, on-device stage uses one or more matching operations.

The entity template of an app is a collection of templates, one for each page class of the app. Each template is essentially an annotated UI tree. As shown in FIG. 6, each UI element in the tree is represented with its leaf-to-root path and annotated with an entity type (e.g., Restaurant) and an entity group identifier (e.g., Group 14). A null value of entity type or group identifier indicates that the content of the UI element could not be classified as a known entity type (e.g., the text "Copyright"). The group identifiers allow clustering entities such that address and cuisine type entities are attributed to the correct restaurant entity. Similarly, UI elements such as Buttons (not shown in the figure) that contain user actions are annotated with their types and groups. To generate an entity template such as the one just described, the analytics service 340 needs to (1) generate content for the app pages, and (2) recognize entities in those pages. In an example embodiment, group identification (and group identifiers) may be used broadly, so that two or more entities may be placed in the same group if these entities are somehow related to each other. For example, a "Like" button and a restaurant name can be in the same group since the "Like" button refers to the restaurant, an address and a restaurant name are in the same group if the address belongs to the restaurant, etc.

Generating Content for App Pages.

To capture the content an app displays at run time, the analytics service 340 can use a UI automation tool (for WP and Android) that can automatically launch an app, interact with its UI elements (by tapping on buttons, filling out text boxes, swiping pages), and navigate to various pages. The service 340 can run the UI automation tool in the cloud (e.g., implemented at the template server 320). The UI automation tool is configured to visit all pages in the app (or run for a long time) and log UI structure and contents of all visited pages. For good coverage, the UI automation tool is also given username/password for apps requiring them, and may be executed several times to log content.

Recognizing Entities in App Pages.

The analytics service 340 extracts entities from app contents (currently text only) captured by the UI automation tool. The extracted entities are then used to generate entity templates. Given some text (web document, news article), the goal is to identify mentions of named entities (e.g., a hotel name). Essentially, this is a classification process that decides what entity a given string refers to. However, due to ambiguity, it may not always be sure about the true entity a name refers to; in this case, it returns a list of candidate entities with associated probabilities.

A key challenge in entity extraction is disambiguation: names of entities are often ambiguous and can have many different meanings. For example, the name "Via Tribunali" can refer to a restaurant in New York or a street name in Italy, depending on its use. To identify the correct entity a name refers to, entity extraction algorithms utilize "context" (i.e., surrounding text) of the name and compare it against some knowledge base or dictionary. In the above example, if the name "Via Tribunali" appears in a document with mentions of other restaurant or food entities, it can be classified as a restaurant with a high probability. On the other hand, if the document contains other addresses, phone numbers and maps, it is most likely a street name.

The UI automation tool may assemble entity templates (e.g., 328). For each UI element in a page class, the UI automation tool produces a set of possible entity types with associated probabilities. For each element, the entity type with the maximum probability can be selected. Entity group identifiers can be assigned by simply applying the pattern sequences discovered above to the leaf nodes of the UI tree.

Appstract API and Use Cases.

The analytics service 340 may provide APIs to the OS and apps. More specifically, the analytics service 340 may provide three data abstractions: entities, user actions, and behavioral data items (BDIs) (or user data items, UDIs; BDIs and UDIs are used interchangeably herein). Entities capture "what" content a user consumes. They consist of type and name, e.g., <restaurant name,"Nara">. Actions capture "how" users interacted with such content. Actions also consist of type and name, where possible types are "positive", "negative" or "neutral" (more about this later). An example of action is <pos action,"book-table">. Entities and actions are extracted through template matching. Entities, actions and interaction history are combined to form BDIs, whose format is the following:

BDI:<id, timestamp, type, name, related_entities, actions, num_taps, time_spent, BDIInfo>

BDIInfo:<app_name, app_page, isTapped, ui_coord, ui_trace>.

A single BDI may contain multiple related entities and multiple actions (aggregated using entity group identifiers). BDIs also contain various implicit indicators of interest.

1) Positive sentiment actions: tap events on UI elements like buttons or hyperlinks with labels (e.g., "like") or launchers (e.g., call number) that signify positive sentiment; similarly, for negative and neutral sentiment actions.

2) Time and frequency of tap events: the time the user spends on a page and how intensively she interacts.

3) Recurrence of the same entity over time and in different apps (computed as a database count).

BDIInfo contains information about where the entity was captured (app, page class, UI element coordinates), whether it was clicked, and what was the sequence of UI events that led to the page containing it (UI trace). This trace can be used to automatically replay user interactions. BDIInfo is intended to be used only by the OS.

BDIs give a compact representation of a user interaction, not only because they aggregate entities and actions occurred over time, but also because "irrelevant" content is discarded. Once the interaction with an app ends (i.e., the app is terminated or remains idle for some time), interaction logs are processed to eliminate loops due to back transitions—these are likely to contain content that the user viewed by mistake or that was not of interest. Moreover, in page classes with multiple entities of the same type (e.g., list of items), only the entity the user interacted with is kept (e.g., tapped item).

The analytics service 340 may provide two types of APIs (e.g., Table 1 in FIG. 7). Online, OS and apps can request the content currently displayed on screen or can request to be notified when specific user actions or type of entities occur (e.g., the page content when a click on "Like" happens). Through this API, it is possible to obtain a kind of snapshot into the user's current activity. Alternatively, which exposes an SQL-like interface. The following is an example of query to find out about the user's cuisine preferences:

SELECT Appstract.METADATA.CUISINE, COUNT(ENTRY_ID) AS TOT
FROM Appstract
WHERE Appstract.POS_ACTION LIKE 'AddToFav'
GROUP BY CUISINE
ORDER BY TOT;

The above query returns cuisine types of entities (i.e., restaurants) that the user added to his Favorites, ordered by occurrence.

Table 2 in FIG. 7 lists eight example use cases which can be implemented using the analytics service 340. Due to lack of space we briefly describe only four of them.

Context Notifications: A restaurant that is reserved (detected by the "book-table" action) or a song the user likes (click on "Like") are examples of "relevant" entities. The OS subscribes to the current View with filters on the interested events and/or entities, and generates timely notifications for other apps to consume. For example, a calendar app can automatically create an entry for a restaurant reservation, and a map app like Google Maps can cache the address and offer navigation at a later point.

App-tasker: Accessibility services (e.g., Google TalkBack) as well as personal digital assistants can use Appstract for task completion. Imagine a user asking to "Play Music". App-tasker queries the Analytics Store for the UI trace associated with each TYPE SONG BDI, and infers: 1) which app can be used for the task, and 2) what sequence of UI events the task involves. Using this sort of task template, the service can more effectively guide the user or even complete the task automatically. For instance, if the UI trace reports that in page "MusicSelect.xaml", a ListItem 0x1489A that contains a TYPE MUSIC GENRE entity was clicked, when replaying the trace the service will automatically click the most frequent TYPE MUSIC GENRE entity found in the user's Analytics Store (or it will request it to the user if unknown). To replay the sequence of UI events transparently to the user, a service like the Android Accessibility Service can be extended.

RankedList and MusicNewsReader: RankedList is a type of UI Element that allows app developers to quickly build personalization into their apps. It provides a simple, yet powerful, abstraction. From the developer perspective it is as simple as creating a List UI Element (no SQL queries, no ranking logic). From a functionality point of view, it is powerful because it enables ranking of objects using behavioral analytics extracted from multiple apps of different categories. We built Music-NewsReader (FIG. 4(d)) which uses this API for ranking music news based on a user's "favorite" music artist, defined as "the one the user listens to most frequently" (list.orderBy(TYPE MUSIC SONG,TYPE MOST FREQUENT)). Other examples of how this API can be used are a shopping app that ranks cooking books based on cuisine preferences or one that suggests ringtones based on music preferences.

FIG. 4 is a schematic diagram illustrating example API use for accessing user data items (UDIs) from the analytics service, in accordance with one or more embodiments. Referring to FIG. 4, one or more of the UDIs generated by the analyzer 344 and/or the UDIs stored in the store 346 may be accessed using, e.g., a query API 404. For example, one or more of the apps 110a, . . . , 110b may request access to the UDIs, and the access control module 402 (which may be part of the analytics service 340) may determine whether the requesting app is authorized to access the store 346 and/or the analyzer 344 to obtain UDIs. The access control 402 may be designated via a policy document, which may specify what type of data can be shared between apps, OS, OS services, and/or other devices (e.g., other devices of the same user).

FIG. 5 is a schematic diagram illustrating example implementations of the analytics service, in accordance with one or more embodiments. As seen in implementation 520 in FIG. 5, the analytics service 340 may be implemented as part of one or more existing applications (e.g., 502, . . . , 504). In implementation 530, the analytics service 340 can be implemented on device 100 as a stand-alone app. In implementation 540, the analytics service 340 may be implemented in a cloud server 512 and applications 502, . . . , 504 can access the analytics service 340 via the network 510. The analytics service 340 may also be partially implemented at the cloud server 512 (e.g., only the store 346 may be at the server 512), and the tracer and analyzer may be implemented at one or more of the apps 502, . . . , 504 (and/or as part of the operating system for a corresponding device).

Figure 8:
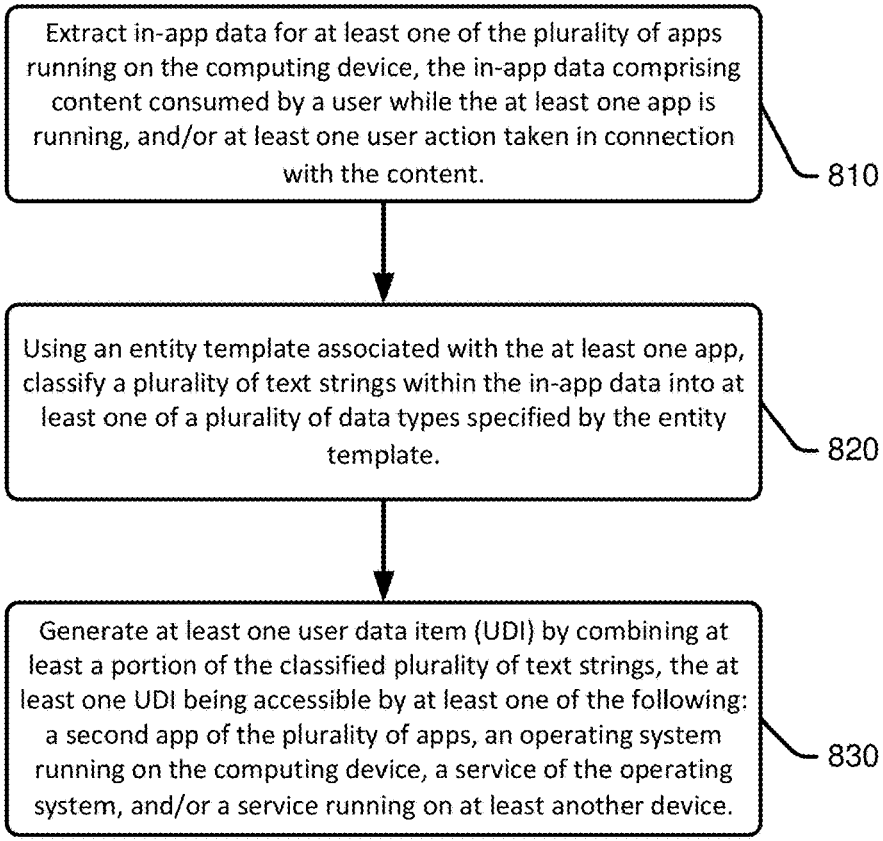
FIGS. 8-10 are flow diagrams illustrating example methods for extracting and sharing application-related user data, in accordance with one or more embodiments.
Figure 9:
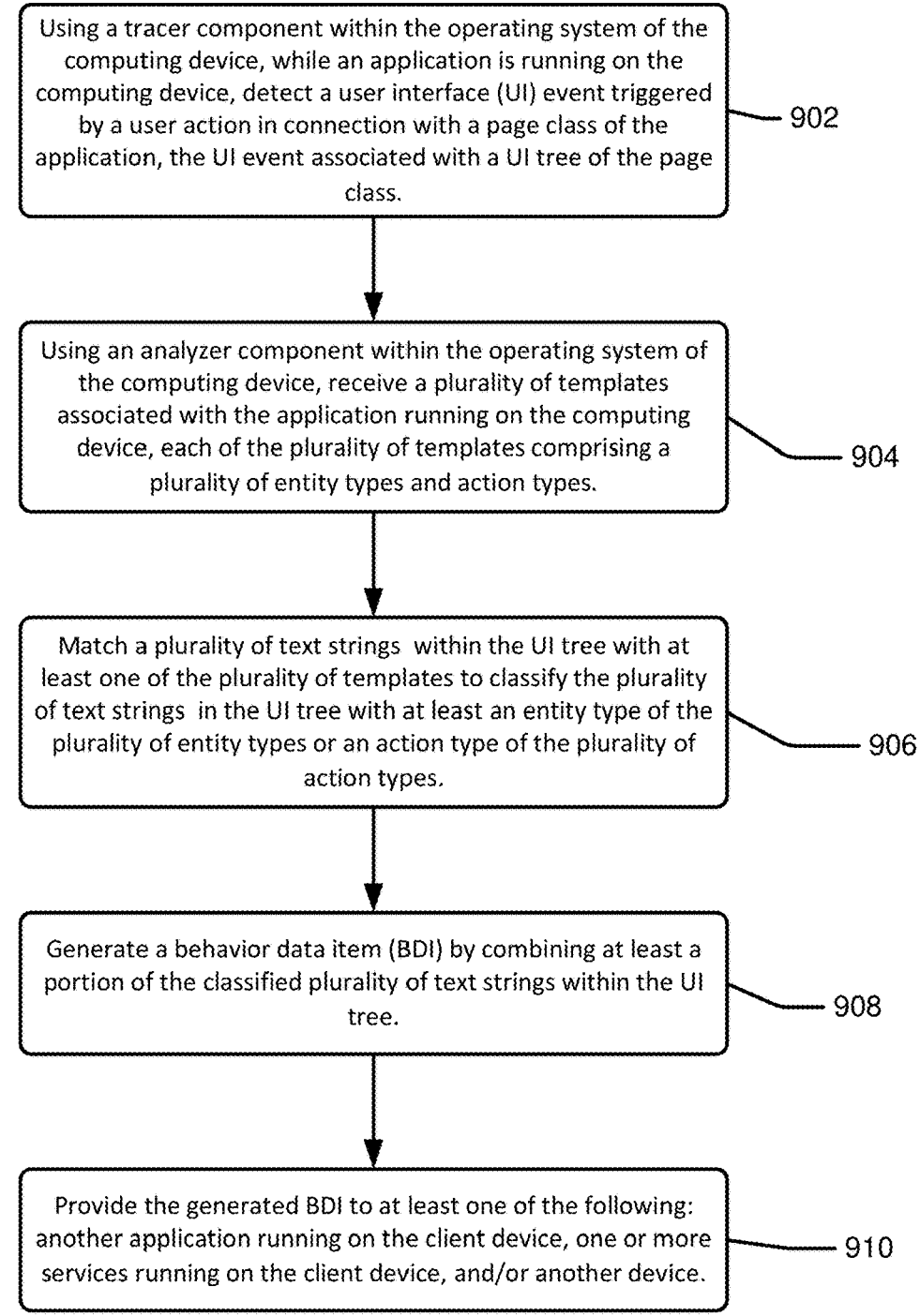
Figure 10:
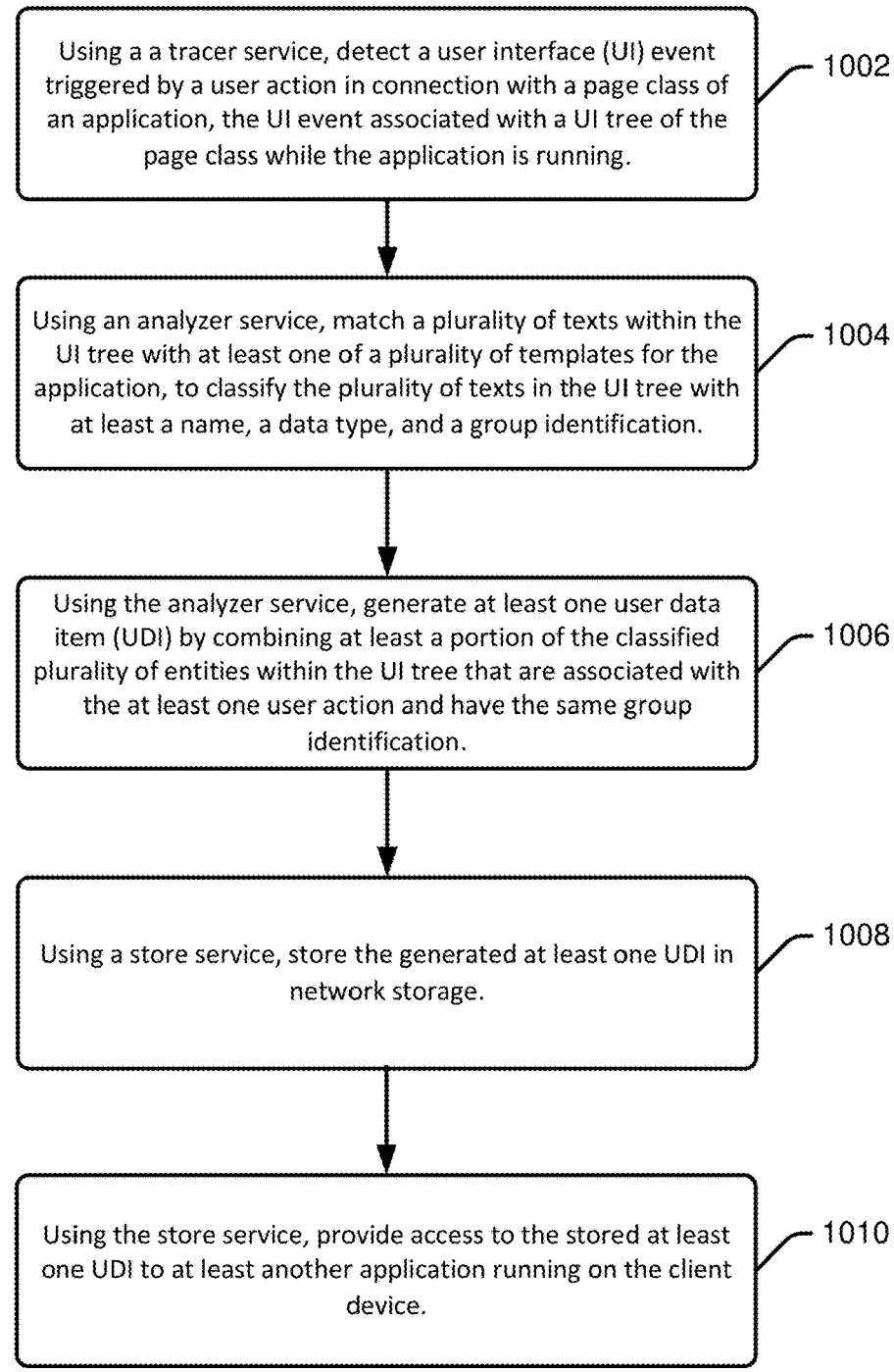

FIGS. 8-10 are flow diagrams illustrating example methods for extracting and sharing application-related user data, in accordance with one or more embodiments. Referring to FIGS. 3A-8, the example method 800 may start at 810, when in-app data for at least one of the plurality of apps (110a) running on a computing device (100) is extracted. The in-app data (348) includes content consumed by a user (e.g., 306, 307) while the at least one app is running, and/or at least one user action (304) taken in connection with the content. At 820, an entity template (328) associated with the at least one app may be used to classify a plurality of text strings (307) within the in-app data into at least one of a plurality of data types (354, . . . , 356) specified by the entity template (328). At 830, at least one user data item (UDI 350) is generated (e.g., by the analyzer 344) by combining at least a portion of the classified plurality of text strings (307). The at least one UDI 350 may be accessible by at least one of the following: a second app of the plurality of apps, an operating system (112) running on the computing device, a service of the operating system (e.g., a digital personal assistant service), and/or a service running on at least another device (e.g., at least another device of the user of device 100).

Referring to FIGS. 3A-7 and 9, the example method 900 may start at 902, when the tracer 342 within the analyzer service 340 may detect a user interface (UI) event (e.g., 304) triggered by a user action in connection with a page class of an application (e.g., 110). The UI event may be associated with a UI tree 306 of the page class. The detecting may be performed using a tracer component 342 within the analytics service 340, which may be part of the operating system 112 of the computing device. The detecting may be performed while an application 110 is running on the computing device.

At 904, the analyzer 344 within the analyzer service 340 may receive a plurality of templates 328 associated with the application 110 running on the computing device, each of the plurality of templates comprising a plurality of entity types (354, . . . , 356) and action types (362, . . . , 364).

At 906, the analyzer 344 may match a plurality of text strings within the UI tree with at least one of the plurality of templates 328 to classify the plurality of text strings in the UI tree with at least an entity type of the plurality of entity types or an action type of the plurality of action types within the templates 328.

At 908, the analyzer 344 may generate a behavioral data item (BDI) (e.g., UDI 350) by combining at least a portion of the classified plurality of text strings within the UI tree.

At 910, the analytics service 340 may provide the generated BDI (e.g., as stored in the store 346) to at least one of the following: another application running on the client device, one or more services running on the client device, and/or another device.

Referring to FIGS. 3A-7 and 10, the example method 1000 may start at 1002, the tracer 342 within the analyzer service 340 may detect a user interface (UI) event (e.g., 304) triggered by a user action in connection with a page class of an application (e.g., 110). The UI event may be associated with a UI tree 306 of the page class. The detecting may be performed using a tracer component 342 within the analytics service 340, which may be part of the operating system 112 of the computing device. The detecting may be performed while an application 110 is running on the computing device.

At 1004, the analyzer 344 within the analyzer service 340 may match a plurality of texts (e.g., 307) within the UI tree (e.g., 306) with at least one of a plurality of templates (e.g., 328) for the application (e.g., one or more of 110a, . . . , 110b), to classify the plurality of texts in the UI tree with at least a name, a data type, and/or a group identification (or another type of entity relationship as specified by the entity relationship information 366).

At 1006, the analyzer 344 within the analyzer service 340 may generate at least one user data item (e.g., UDI 350) by combining at least a portion of the classified plurality of entities within the UI tree that are associated with the at least one user action and have the same group identification (or are otherwise associated via an identified entity relationship 366).

At 1008, the analytics service 340 may store the generated at least one UDI in network storage (e.g., store 346, which may be on-device or remote storage implemented in hardware and/or software).

At 1010, the analytics service 340 may provide access to the store 346 and to the stored at least one UDI. For example, access may be provided to at least another application running on the client device, the OS 112, a service of the OS 112 (e.g., a digital personal assistant), and/or another computing device.

Figure 11:
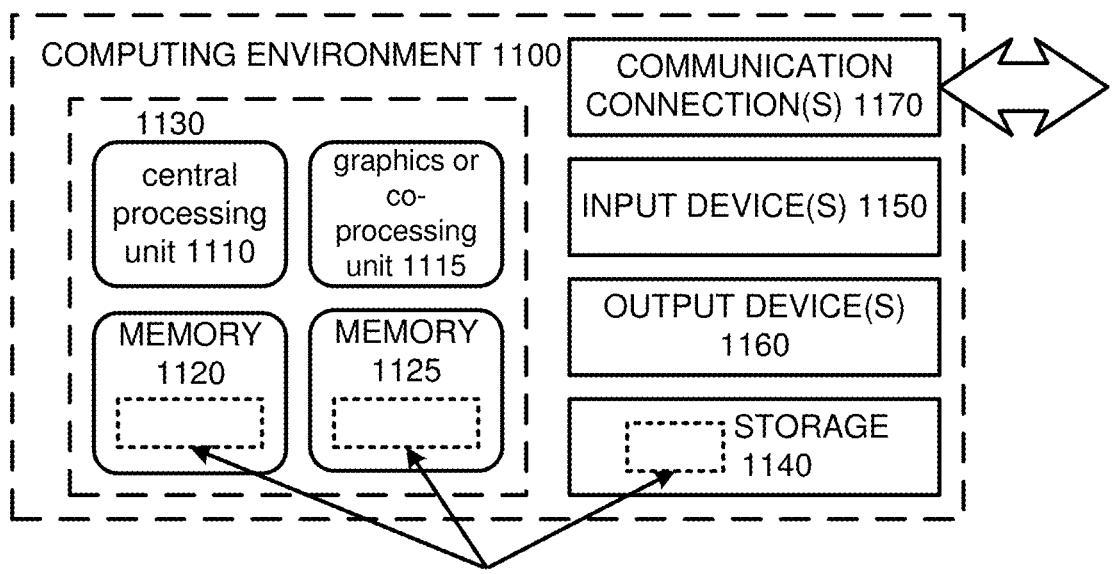
FIG. 11 is a diagram of an example computing system, in which some described embodiments can be implemented.

FIG. 11 is a diagram of an example computing system, in which some described embodiments can be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), nonvolatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may also have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 12:
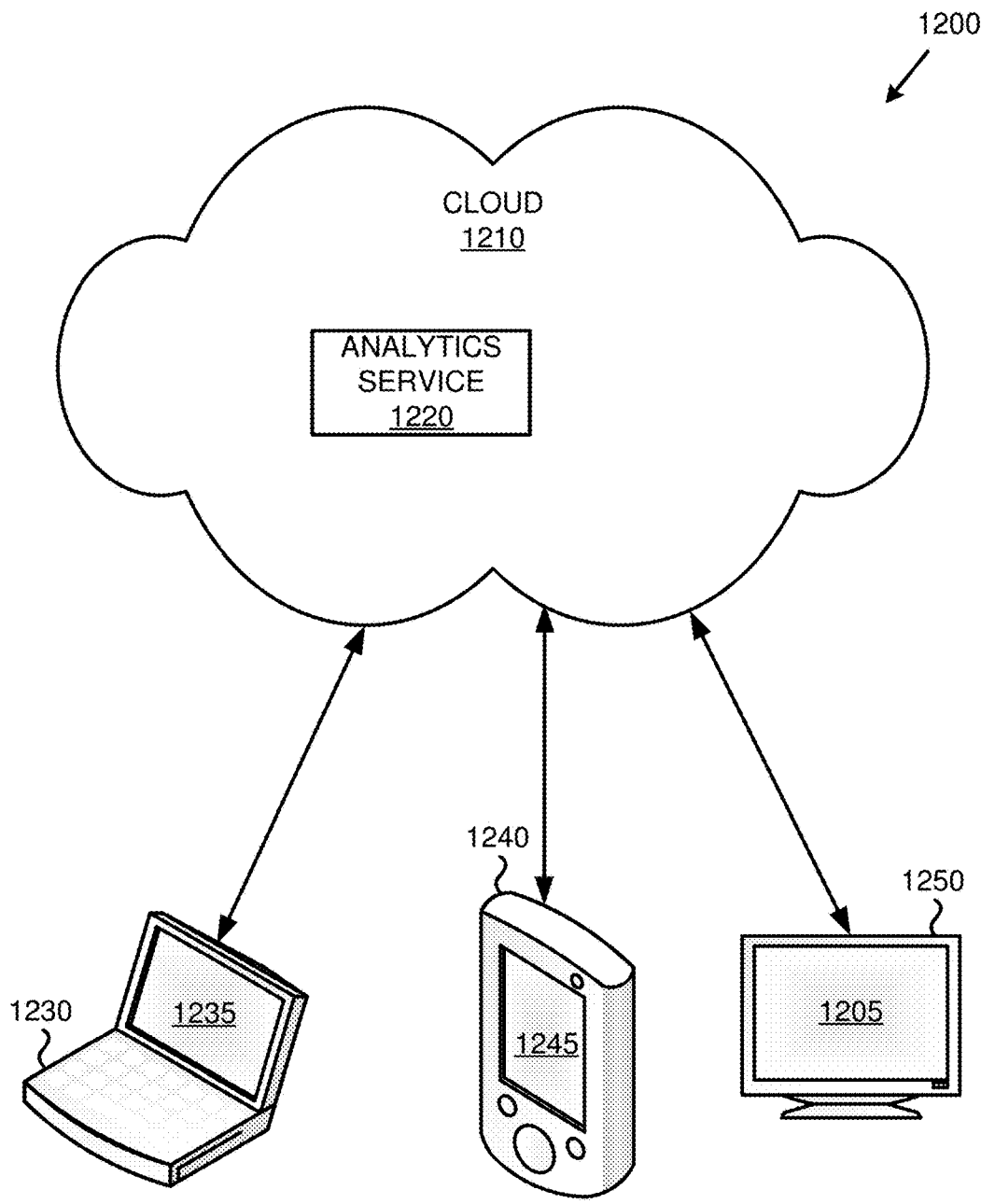
FIG. 12 illustrates a generalized example of a suitable cloud-supported environment, in which described embodiments, techniques, and technologies may be implemented.

FIG. 12 illustrates a generalized example of a suitable cloud-supported environment 1200, in which described embodiments, techniques, and technologies may be implemented. In the example environment 1200, various types of services (e.g., computing services) are provided by a cloud 1210. For example, the cloud 1210 can comprise a collection of computing devices, which may be located centrally or distributed, that provide cloud-based services to various types of users and devices connected via a network such as the Internet. The implementation environment 1200 can be used in different ways to accomplish computing tasks. For example, some tasks (e.g., processing user input and presenting a user interface) can be performed on local computing devices (e.g., connected devices 1230, 1240, 1250), while other tasks (e.g., storage of data to be used in subsequent processing) can be performed in the cloud 1210.

In example environment 1200, the cloud 1210 provides services for connected devices 1230, 1240, 1250 with a variety of screen capabilities. Connected device 1230 represents a device with a computer screen 1235 (e.g., a mid-size screen). For example, connected device 1230 could be a personal computer such as desktop computer, laptop, notebook, netbook, or the like. Connected device 1240 represents a device with a mobile device screen 1245 (e.g., a small size screen). For example, connected device 1240 could be a mobile phone, smart phone, personal digital assistant, tablet computer, and the like. Connected device 1250 represents a device with a large screen 1255. For example, connected device 1250 could be a television screen (e.g., a smart television) or another device connected to a television (e.g., a set-top box or gaming console) or the like.

One or more of the connected devices 1230, 1240, and/or 1250 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services related to extracting and sharing of application-related user data can be provided by the cloud 1210 through the analytics service 1220. The service 1220 may have functionalities similar to the analytics service 340 as described herein.

In the example environment 1200, the cloud 1210 provides one or more of the technologies and solutions described herein to the various connected devices 1230, 1240, and/or 1250 using, at least in part, the RTAAS 1220.

Figure 13:
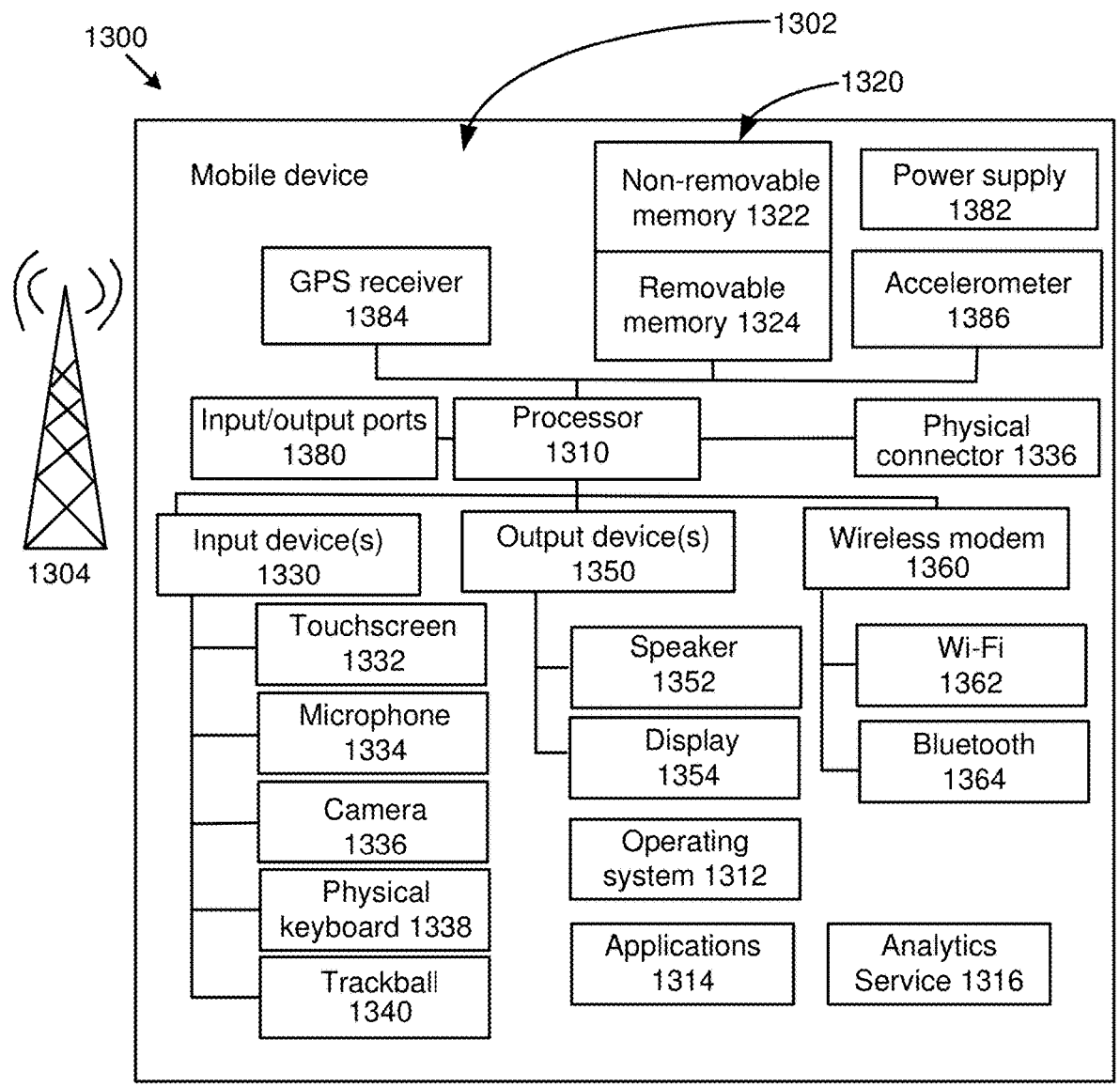
FIG. 13 is an example mobile device that can be used in conjunction with the technologies described herein.

FIG. 13 is an example mobile device that can be used in conjunction with the technologies described herein. Referring to FIG. 13, the example mobile device 1300 may include a variety of optional hardware and software components, shown generally at 1302. Any components 1302 in the mobile device 1300 can communicate with any other component, although not all connections are shown, for ease of illustration. The mobile device 1300 can be any of a variety of computing devices (e.g., cell phone, smartphone, handheld computer, Personal Digital Assistant (PDA), etc.) and can allow wireless two-way communications with one or more mobile communications networks 1304, such as a cellular, satellite, or other network.

The illustrated mobile device 1300 can include a controller or processor 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components 1302 and support for one or more application programs 1314. The application programs can include common mobile computing applications (e.g., email applications, calendars, contact managers, web browsers, messaging applications), or any other computing application.

The illustrated mobile device 1300 can include memory 1320. Memory 1320 can include non-removable memory 1322 and/or removable memory 1324. The non-removable memory 1322 can include RAM, ROM, flash memory, a hard disk, or other well-known memory storage technologies. The removable memory 1324 can include flash memory or a Subscriber Identity Module (SIM) card, which is well known in GSM communication systems, or other well-known memory storage technologies, such as "smart cards." The memory 1320 can be used for storing data and/or code for running the operating system 1312 and the applications 1314. Example data can include web pages, text, images, sound files, video data, or other data sets to be sent to and/or received from one or more network servers or other devices via one or more wired or wireless networks. The memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1300 can support one or more input devices 1330, such as a touchscreen 1332, microphone 1334, camera 1336, physical keyboard 1338 and/or trackball 1340, and one or more output devices 1350, such as a speaker 1352 and a display 1354. Other possible output devices (not shown) can include piezoelectric or other haptic output devices. Some devices can serve more than one input/output function. For example, touchscreen 1332 and display 1354 can be combined in a single input/output device.

The input devices 1330 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1312 or applications 1314 can comprise speech-recognition software as part of a voice user interface that allows a user to operate the device 1300 via voice commands. Further, the device 1300 can comprise input devices and software that allows for user interaction via a user's spatial gestures, such as detecting and interpreting gestures to provide input to a gaming application.

A wireless modem 1360 can be coupled to an antenna (not shown) and can support two-way communications between the processor 1310 and external devices, as is well understood in the art. The modem 1360 is shown generically and can include a cellular modem for communicating with the mobile communication network 1304 and/or other radio-based modems (e.g., Bluetooth 1364 or Wi-Fi 1362). The wireless modem 1360 is typically configured for communication with one or more cellular networks, such as a GSM network for data and voice communications within a single cellular network, between cellular networks, or between the mobile device and a public switched telephone network (PSTN).

The mobile device can further include at least one input/output port 1380, a power supply 1382, a satellite navigation system receiver 1384, such as a Global Positioning System (GPS) receiver, an accelerometer 1386, and/or a physical connector 1390, which can be a USB port, IEEE 1394 (FireWire) port, and/or RS-232 port. The illustrated components 1302 are not required or all-inclusive, as any components can be deleted and other components can be added.

In an example embodiment of the disclosure, the mobile device 1300 may further include an analytics service 1316, which may be separate from (e.g., a stand-alone application) or implemented as part of the operating system 1312, the applications 1314, and/or the device processor 1310. The analytics service 1316 may have functionalities similar to the analytics service 340, as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. By way of example and with reference to FIG. 13, computer-readable storage media may include memory and storage 1320, 1322, and 1324. The term "computer-readable storage media" does not include signals and carrier waves. In addition, the term "computer-readable storage media" does not include communication connections (e.g., 1170, 1360, 1362, and 1364).

In accordance with an example embodiment of the disclosure, a method may include tracking one or more geofences using a GNSS (e.g., GPS) hardware processor within a computing device. The tracking may use at least one GNSS (e.g., GPS) signal. State changes of the one or more geo-fences during the tracking may be saved in a shared state database. The shared state database may be shared between the GNSS hardware processor and an application processor within the computing device. Upon detecting a deterioration of the at least one GNSS signal, tracking the one or more geo-fences using the GNSS hardware processor may be switched to tracking the one or more geo-fences using the application processor. After the switching, an initial state of each of the one or more geo-fences may be set using states currently stored in the shared state database prior to the switching.

In accordance with another example embodiment of the disclosure, a computing device may include a GNSS (e.g., GPS) hardware processor configured to track one or more geo-fences using at least one GNSS (e.g., GPS) signal; an application processor configured to take over tracking the one or more geo-fences upon deterioration of the at least one GNSS signal; and a shared state database configured to store state changes of the one or more geo-fences during the tracking. The shared state database may be shared between the GNSS hardware processor and the application processor. Upon switching from tracking the one or more geo-fences using the GNSS hardware processor to tracking the one or more geo-fences using the application processor, the application processor may be operable to set an initial state of each of the one or more geo-fences using states currently stored in the shared state database prior to the switching. Upon detecting an improvement of the at least one GNSS signal, tracking the one or more geo-fences using the application processor may be switched to tracking the one or more geo-fences using the GNSS hardware processor. After the switching back, an initial state of each of the one or more geo-fences may be set using the states currently stored in the shared state database prior to the switching back.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by a computing device for extracting and sharing application-related user data, the method comprising:
   while a first application is running on the computing device, detecting a user interface (UI) event triggered by a user action interacting with the first application, wherein the UI event is in connection with a page class of the first application, and wherein the UI event is associated with a UI tree of the page class;
   receiving a plurality of templates associated with the first application running on the computing device, each of the plurality of templates comprising a plurality of UI elements of the first application, representing structural properties of the first application, and each UI element's respective entity type and action type;
   matching a plurality of text strings within the UI tree with at least one of the plurality of templates to classify the plurality of text strings with at least an entity type of the plurality of entity types or an action type of the plurality of action types;
   storing information describing the user action in association with the first application in an operating system store; and
   transmitting the stored information describing the user action to a second application upon receiving a request to access the operating system store.

2. The method according to claim 1, wherein the UI event comprises receiving a plurality of text strings while the first application is running.

3. The method according to claim 1, further including a tracer component and an analyzer component that are executing on the computing device, wherein the tracer component detects the UI event and the analyzer component stores the information describing the user action in the operating system store.

4. The method according to claim 3, wherein the tracer component and the analyzer component are implemented as part of the operating system.

5. The method according to claim 3, wherein the tracer component and the analyzer component are implemented as part of an application running on the computing device.

6. The method according to claim 3, wherein the computing device is a first platform and the second application executes on a second platform, different than the first platform.

7. The method according to claim 1, wherein the storing information further includes storing timing information related to the user's interaction with the first application.

8. The method according to claim 1, further comprising appending the information stored in the operating system store with one or more of the following:
an identification number associated with the information;
a time stamp associated with the user action;
a number of UI taps associated with the user action; and
an amount of time spent at a page where the user action took place.

9. A computing device, comprising:
a processing unit; and
a memory;
the computing device configured to perform operations for extracting and sharing application-related user data, the operations comprising:
while a first application is running on the computing device, detecting a user interface (UI) event triggered by a user action interacting with the first application, wherein the UI event is in connection with a page class of the first application, and wherein the UI event is associated with a UI tree of the page class;
receiving a plurality of templates associated with the first application running on the computing device, each of the plurality of templates comprising a plurality of UI elements of the first application, representing structural properties of the first application, and each UI element's respective entity type and action type;
matching a plurality of text strings within the UI tree with at least one of the plurality of templates to classify the plurality of text strings with at least an entity type of the plurality of entity types or an action type of the plurality of action types;
storing information describing the user action in association with the first application in an operating system store; and
transmitting the stored information describing the user action to a second application upon receiving a request to access the operating system store.

10. The computing device of claim 9, wherein the UI event comprises receiving a plurality of text strings while the first application is running.

11. The computing device of claim 9, further including a tracer component and an analyzer component that are executing on the computing device, wherein the tracer component detects the UI event and the analyzer component stores the information describing the user action in the operating system store.

12. The computing device of claim 11, wherein the tracer component and the analyzer component are implemented as part of the operating system.

13. The computing device of claim 11, wherein the tracer component and the analyzer component are implemented as part of an application running on the computing device.

14. The computing device of claim 11, wherein the computing device is a first platform and the second application executes on a second platform, different than the first platform.

15. The computing device of claim 9, wherein the storing information further includes storing timing information related to the user's interaction with the first application.

16. The computing device of claim 9, the operations further comprising appending the information stored in the operating system store with one or more of the following:
an identification number associated with the information;
a time stamp associated with the user action;
a number of UI taps associated with the user action; and
an amount of time spent at a page where the user action took place.

17. One or more computer-readable storage media storing computer-executable instructions for execution on a computing device to perform operations, the operations comprising:
while a first application is running on the computing device, detecting a user interface (UI) event triggered by a user action interacting with the first application, wherein the UI event is in connection with a page class of the first application, and wherein the UI event is associated with a UI tree of the page class;
receiving a plurality of templates associated with the first application running on the computing device, each of the plurality of templates comprising a plurality of UI elements of the first application, representing structural properties of the first application, and each UI element's respective entity type and action type;
matching a plurality of text strings within the UI tree with at least one of the plurality of templates to classify the plurality of text strings with at least an entity type of the plurality of entity types or an action type of the plurality of action types;
storing information describing the user action in association with the first application in an operating system store; and
transmitting the stored information describing the user action to a second application upon receiving a request to access the operating system store.

18. The one or more computer-readable storage media of claim 17, wherein the UI event comprises receiving a plurality of text strings while the first application is running.

19. The one or more computer-readable storage media of claim 17, wherein the storing information further includes storing timing information related to the user's interaction with the first application.

20. The one or more computer-readable storage media of claim 17, the operations further comprising appending the information stored in the operating system store with one or more of the following:
an identification number associated with the information;
a time stamp associated with the user action;
a number of UI taps associated with the user action; and
an amount of time spent at a page where the user action took place.

* * * * *